United States Patent [19]

Goodburn et al.

[11] Patent Number: 4,620,985
[45] Date of Patent: Nov. 4, 1986

[54] CIRCUMFERENTIAL GROOVE COATING METHOD FOR PROTECTING A GLASS BOTTLE

[75] Inventors: William H. Goodburn, Columbus, Ohio; Robert E. Waugh, Sun City Center, Fla.

[73] Assignee: The D. L. Auld Company, Columbus, Ohio

[21] Appl. No.: 715,102

[22] Filed: Mar. 22, 1985

[51] Int. Cl.⁴ ............................................. B05D 3/06
[52] U.S. Cl. ..................................... 427/55; 427/140; 427/240; 427/389.7
[58] Field of Search .............. 427/55, 140, 240, 389.7

[56] References Cited

U.S. PATENT DOCUMENTS

| | | | |
|---|---|---|---|
| Re. 30,805 | 11/1981 | Rhoads | 428/35 |
| 3,331,521 | 7/1967 | Paige | 215/1 |
| 3,542,229 | 11/1970 | Beyerlein et al. | 215/1 |
| 3,617,339 | 11/1971 | Kiwiet | 427/240 |
| 3,825,142 | 7/1974 | Campagna | 215/1 C |
| 3,912,100 | 10/1975 | Graham et al. | 215/12 |
| 3,924,767 | 12/1975 | Arrandale et al. | 215/12 R |
| 3,950,199 | 4/1976 | Lucas | 156/86 |
| 3,972,435 | 8/1976 | Sasaki et al. | 215/12 R |
| 4,053,666 | 10/1977 | Taylor et al. | 428/35 |
| 4,082,200 | 4/1978 | Guest et al. | 215/1 C |
| 4,092,447 | 5/1978 | Frederick et al. | 427/286 |
| 4,129,225 | 12/1978 | Bailey | 215/12 R |
| 4,143,784 | 3/1979 | Frahm et al. | 215/12 R |
| 4,190,168 | 2/1980 | Jacques | 215/12 R |
| 4,207,356 | 6/1980 | Waugh | 427/55 |
| 4,238,041 | 12/1980 | Jönsson et al. | 215/12 R |
| 4,268,544 | 5/1981 | Gras | 428/35 |
| 4,273,834 | 6/1981 | Yokokura et al. | 428/429 |
| 4,275,097 | 6/1981 | Shriver | 427/286 |
| 4,370,385 | 1/1983 | Yoshida et al. | 428/429 |

*Primary Examiner*—Thurman K. Page
*Attorney, Agent, or Firm*—Killworth, Gottman, Hagan & Schaeff

[57] ABSTRACT

A method of protecting at least one portion of the surface of a glass bottle from scuffing due to contact with bottle handling and filling equipment, other bottles, and bottle containers, comprises the step of providing a glass bottle defining a circumferential groove in the area to be protected. The bottle is rotated about a horizontal axis and an uncured plastic liquid is applied to the bottle surface by flow coating the plastic into the circumferential groove. An amount of plastic liquid is applied which is sufficient to fill completely the circumferential groove. The plastic liquid is then cured to produce a bottle which is protected from scuffing by a circumferential band of plastic material in the area to be protected.

20 Claims, 11 Drawing Figures

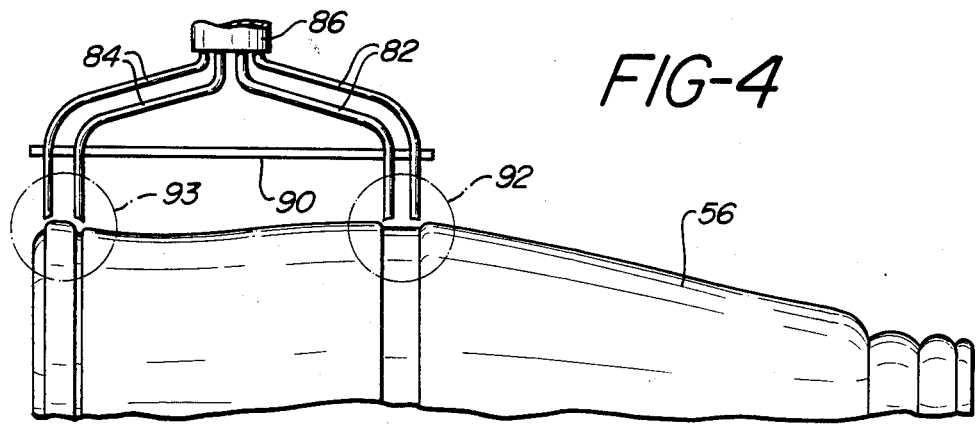
FIG-4
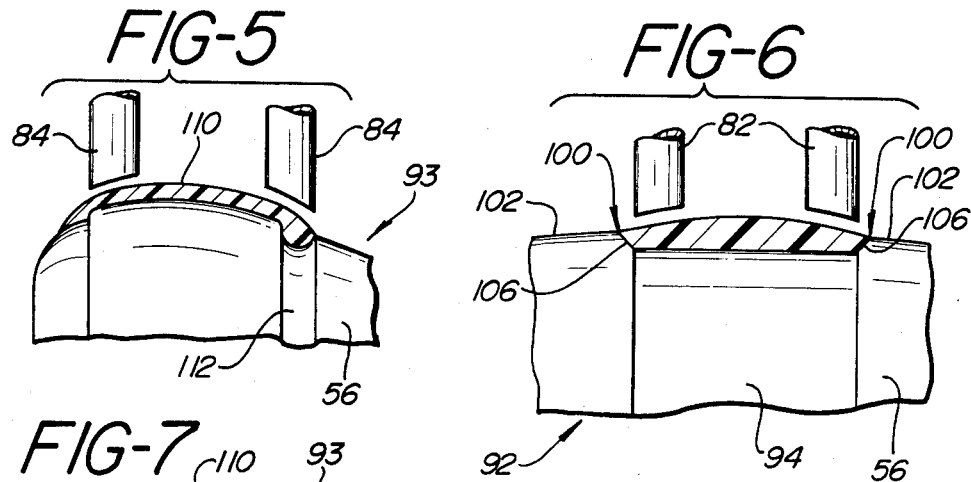
FIG-5
FIG-6
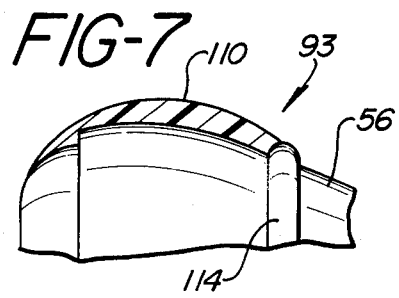
FIG-7
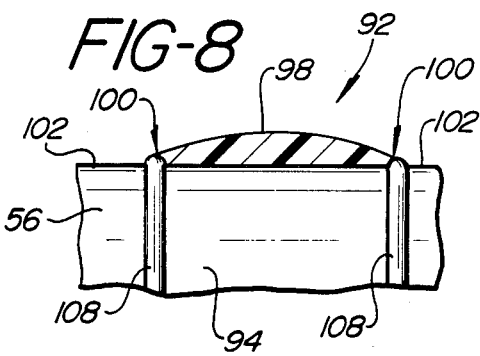
FIG-8
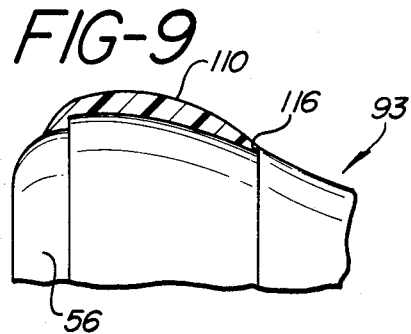
FIG-9

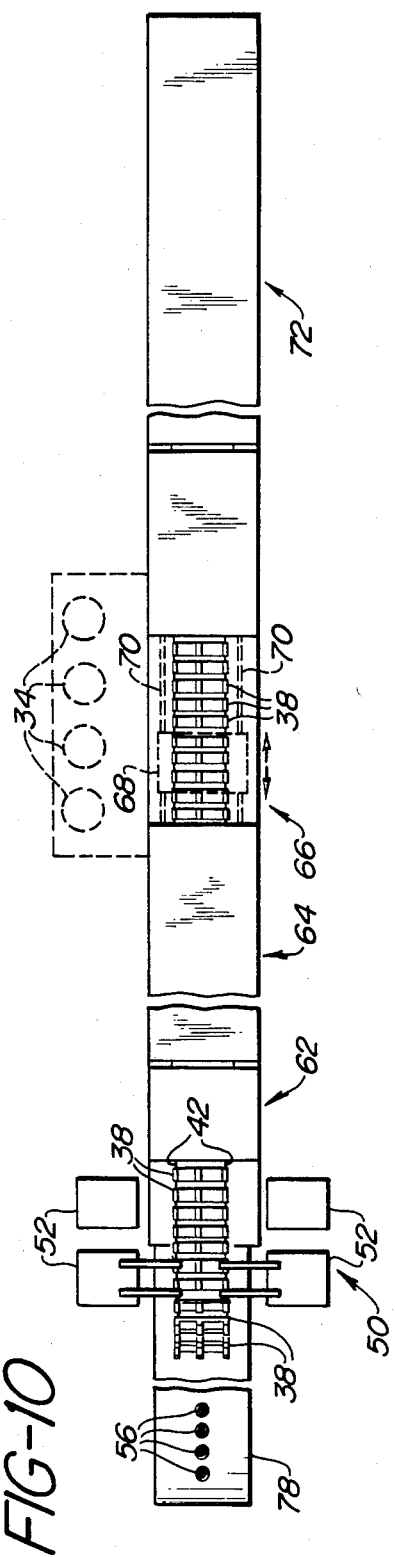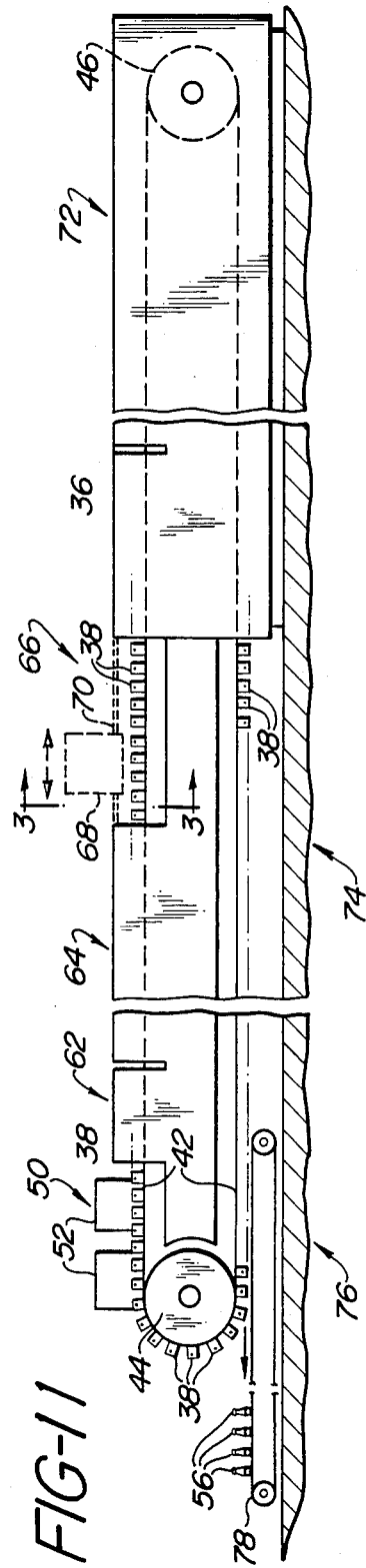

CIRCUMFERENTIAL GROOVE COATING METHOD FOR PROTECTING A GLASS BOTTLE

BACKGROUND OF THE INVENTION

The present invention relates to bottle coating and, more specifically, to a method of coating the exterior surface of a glass bottle with a band of plastic material that extends around the bottle to protect the bottle from scuffing.

Many of the glass bottles which are used for beer and soft drinks are reusable. The purchaser leaves a bottle deposit with the grocery or supermarket and when he returns the emptied bottles, his deposit is refunded. Glass bottles may be cleaned, sterilized, and refilled with a beverage many times. Such extended usage of a bottle accentuates severely the problems encountered with scuff marks on the exterior surface of the bottle. Such scuffing typically occurs as a result of the exterior surface of the bottle, adjacent the larger diameter portions of the bottle, contacting bottle handling and filling equipment, other bottles, and bottle containers. Scuff marks left on surface of the bottle impair markedly the appearance of the bottle and therefore detract from the marketability of the bottled beverage.

One approach taken to eliminate the difficulties previously encountered with unsightly scuffs on returnable bottles is disclosed in U.S. Pat. No. 4,370,385, issued Jan. 25, 1983, to Yoshida, and U.S. Pat. No. 4,273,834, issued June 16, 1981, to Yokokura et al. These two patents relate to a composition which, when applied to the scuffed area on the bottle, makes the scuff marks much less noticeable, thus masking the scuff marks.

Another approach to the problem of abrasions on glass bottles is shown in U.S. Pat. No. 3,950,199, issued Apr. 13, 1976, to Lucas. The Lucas patent suggests substantially completely covering a glass bottle with a coating material to protect the bottle. The upper, shoulder area of the bottle is coated with a film of organic polymeric material. A cylindrical sheath of contractable thermoplastic material is then placed around the main body portion of the bottle and heat-shrunk onto the bottle. The Lucas patent is concerned with the prevention of severe scratches and abrasions which cause a reduction of the strength of a glass bottle. Lucas is not concerned with the cosmetic nature of scuffs but rather focuses on their effect on bottle strength. As a consequence, Lucas finds it necessary to coat bottles substantially completely.

U.S. Pat. No. 3,912,100, issued Oct. 14, 1975, to Graham et al discloses a bottle coating arrangement in which a coating is first formed by applying organic plastic materials over localized exterior surface areas of the bottle so that a sleeve or sleeves of heat-shrinkable thermoplastic material may then conform to the surface of the bottle in a snug fitting relationship. This encapsulation of the bottle increases bottle strength substantially while, at the same time, increasing safety in the event that the bottle breaks. In similar fashion, U.S. Pat. No. 3,542,229, issued Nov. 24, 1970, to Beyerlein discloses applying sheaths of stretchable heat-shrinkable plastic film to a bottle and then shrinking them onto the bottle. Such heat shrink plastic banding is effective, but unsightly, thus reducing the positive effects gained from eliminating scuffs.

Finally, U.S. Pat. No. 4,207,356, issued June 15, 1980, to Waugh discloses apparatus for coating an entire bottle with a plastic liquid material. The liquid is flow coated onto the exterior surface of the bottle as the bottle is rotated. The liquid material is supplied to the bottle surface by means of a plurality of liquid supply tubes. Subsequent to application and smoothing of the liquid material, curing is effected by irradiating the material with infrared radiation.

While the Waugh '356 patent discloses complete bottle coating, it will be appreciated that such coating is relatively expensive due to the quantity of plastic liquid which is consumed. Although complete coating of the surface of a bottle is usually not needed to prevent scuffing, especially where the bottle varies in diameter, prior art techniques have not permitted only coating a portion of the bottle surface and making the transitions between coated and non-coated areas smooth and precise. It is seen, therefore, that there is a need for a simple, economical method of protecting bottles from scuffing by coating in bottles only in the areas where scuffing is most likely to occur.

SUMMARY OF THE INVENTION

A method of protecting a portion of the surface of a glass bottle from scuffing due to contact with bottle handling and filling equipment, other bottles, and bottle containers, includes the steps of:

(a) providing a glass bottle with a circumferential groove in the area to be protected;

(b) rotating the bottle about a horizontal axis;

(c) applying uncured plastic liquid to the bottle surface by flow coating the plastic liquid into the circumferential groove from a liquid applicator nozzle means, an amount of plastic liquid being applied which is sufficient to fill completely the circumferential groove; and, (d) curing the plastic liquid to produce a bottle which is protected from scuffing by a circumferential band of plastic material.

The uncured plastic liquid may be a liquid polyurethane having a polyether polyol component, and an aliphatic diisocyanate component, and which cures under infrared irradiation. The curing of the plastic material may include the step of rotating the bottle as the plastic liquid cures. The bottle may be primed with silane prior to being coated with the polyurethane.

The method may further include the step of providing a plurality of circumferential grooves in the bottle surface and applying uncured plastic liquid to fill the grooves.

The groove may be between 0.005 inch and 0.020 inch in depth, and between 0.25 inch and 0.75 inch in width. The plastic band may weigh approximately 0.1 gram per lineal inch, and may be thicker along its center line than the depth of the circumferential groove, such that the band is slightly crowned.

The circumferential groove may be defined by a generally flat circumferential bottom surface which extends between a pair of circumferential side walls. The side walls are curved in section. Alternatively, the circumferential groove may be defined between a pair of circumferentially extending ribs, each such rib being semi-circular in section.

The circumferential groove may be semi-circular in section and have a radius which is approximately 0.02 inch to 0.060 inch. The circumferential band may be a raised bead of plastic material having a radius in cross section of approximately 0.008 inch to approximately 0.012 inch.

In some instances it is possible to apply the bands directly to the bottle without use of retaining grooves on ribs. While early efforts to do so proved unsuccessful, it has now been found possible if the bottle is preheated, the uncured plastic liquid contains the thickness and, is applied to a relatively flat portion of the bottle's surface, and the plastic is rapidly cured. By controlling these parameters it is possible to place a band on the bottle which will suffice in certain instances such as, for example, when there is no criticality in the sharpness of the edges of the band.

The method may further include the step of applying uncured plastic liquid in a band around the base of the bottle, whereby scuffing of the bottle adjacent the base is substantially reduced. The upper edge of the band, when the band is around the base of the bottle, may be confined in any one of a number of ways in order to facilitate flow coating and, at the same time, provide a pleasing external appearance. The upper edge of the band around the base of the bottle may be confined by an offset. Alternatively, the upper edge of the band around the base of the bottle may be confined by a ridge which is semi-circular in section. Finally, the upper edge of the band around the base of the bottle may be confined by a circumferential groove which is generally semi-circular in section.

The liquid applicator nozzle means may include a plurality of fluid carrying tubes. Means are provided for supplying plastic liquid to the fluid carrying tubes under pressure, whereby the plastic liquid emerges from the tubes and merges together to form an uncured band of plastic liquid in the groove. Due to the smooth and even transition which the present invention provides between coated and uncoated areas, an aesthetically appealing bottle is produced. The applicator nozzle means may include a plurality of fluid carrying tubes which are associated with each of the circumferential grooves. Accordingly, it is an object of the present invention to provide a method for bottle coating in which a bottle is coated in a number of surface areas; to provide such a method in which the surface areas on the bottle are coated simultaneously to provide such a method in which grooves on the bottle surface define at least some of the areas to be coated; and to provide such a method in which the means for applying the coating liquid to the bottle surface include multiple nozzle tubes.

Other objects and advantages of the invention will be apparent from the following description, the accompanying drawings and the appended claims.

BRIEF DESCRIPTION OF THE DRAWINGS

FIG. 4 is an enlarged partial view of one bottle, similar to FIG. 3, showing the applicator nozzle means;

FIGS. 5, 7 and 9 are enlarged partial views of coated bottles, with the bands of plastic material around the base of the bottles in section;

FIGS. 6 and 8 are enlarged partial views of the mid-portions of bottles, illustrating plastic bands formed in circumferential grooves with the plastic material in section;

FIG. 10 is a plan view of bottle coating apparatus, with the nozzle carriage which carries the liquid applicator nozzle means, and with the plastic liquid supply tanks being shown in dashed lines; and FIG. 11 is a side view of the apparatus of FIG. 10.

DETAILED DESCRIPTION OF THE PREFERRED EMBODIMENT

Figure 1:
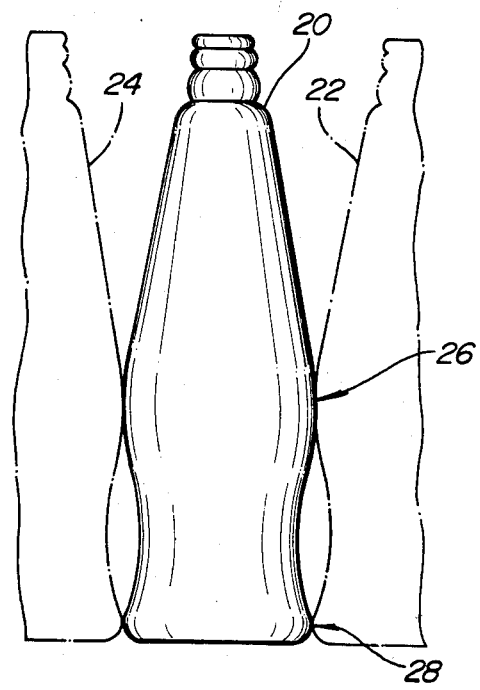
FIG. 1 depicts a number of prior art beverage bottles, showing how scuff marks may be formed by contact between bottles.

The present invention relates to a method of protecting glass bottles from unsightly scuff marks which limit the number of times that the bottles can be reused. FIG. 1 illustrates a beverage bottle 20 in solid lines, with adjacent bottles 22 and 24 being shown in dashed lines. Reusable bottles come into contact with each other throughout their useful lives. Bottles 20, 22 and 24 may, for example, be lined up on conveyor feeding a bottle filling machine which will fill them with a beverage and then cap them. Since all of the bottles have the same external contour, they come into contact with each other in the region or regions of largest diameter. With bottles shaped as illustrated in FIG. 1, contact occurs in the area 26 and in the base area 28. Contact between the bottles produces scuffing of their exterior surfaces to a degree that, eventually, the bottles must be discarded. Contact between the bottles and other objects, such as filling equipment and bottle containers, may also cause scuffing. Scuff marks are aesthetically unappealing and therefore reduce the marketability of the beverage which is contained in the scuffed bottles. In some cases it has been found that prior art bottles are only acceptable in appearance through three or four refilling cycles, although structurally the bottles may be reused as many as fifteen times without significant deterioration.

Figure 2:
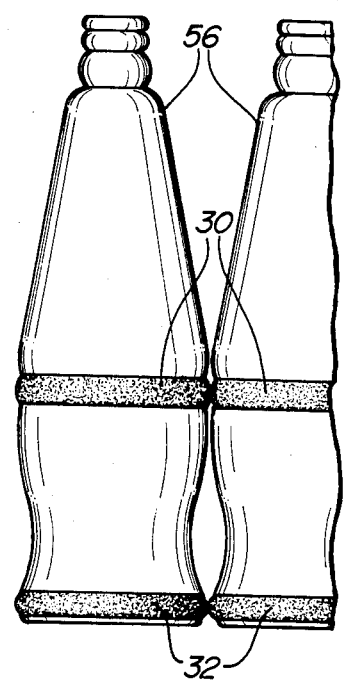
FIG. 2 depicts a pair of bottles coated according to the present invention, including circumferential bands of plastic material which protect the areas where contact between the bottles occurs.

By the present invention, the useful life of refillable beverage bottles has been extended markedly by reducing substantially the scuff marks whch would otherwise occur from contact between the bottles and bottle handling and filling equipment, other bottles, and bottle containers. FIG. 2 illustrates bottles which, according to the present invention, are protected from scuffing by circumferential bands of plastic 30 and 32. Bands 30 extend around the mid-portions of the bottles, while bands 32 extend around the bases of the bottles. Note that the bands are relatively narrow and that only a very limited amount of plastic material is needed to protect the portions of the surfaces of the glass bottles from scuffing.

FIGS. 3, 4, 10 and 11 illustrate the apparatus which coats the bottles according to the present invention, while FIGS. 5-9 illustrate the various configurations of glass bottles and plastic bands which may be utilized. The apparatus shown in FIGS. 3, 4, 10 and 11 is, in most respects, identical to that disclosed in U.S. Pat. No. 4,207,356, issued June 10, 1980, to Waugh, and assigned to the assignee of the present invention, the teaching of which is hereby incorporated into the present application by reference. Several differences do exist, however, between the apparatus disclosed herein and that disclosed in Waugh '356, and these differences are specifically pointed out and discussed below.

The bottles to be protected are coated with an uncured liquid plastic material, such as polurethane liquid plastic, which is quickly cured under either ultraviolet or infrared radiation. Other curable plastic materials having similar properties may be utilized as well. Preferred is a mixture of "A" and "B" components of the type disclosed in U.S. Pat. No. 4,100,010, issued July 11, 1978, to Waugh. These components are stored separately in tanks 34. The mixture is one of a polyether polyol components ("A"), which may be difunctional, trifunctional or tetrafunctional polypropylene glycol containing a suitable catalyst, and a diisocyante component ("B") such as an aliphatic diisocyanate. An example of the diisocyanate is Desmodur W from Mobay, and the polyester polyol may be one or more of the Pluracol materials (P 410 or TP-440) from BSF Wyandotte. It may also be a polyether-polyester polyol combination. The ratio of components A:B is preferably 50-60:40-50. A polyester polyol or polylactone polyol may be used in place of the polyether polyol. The mixture of "A" and "B" components of this type cures, through catalytic action, when heated, as by infrared radiation.

It has also been found that the addition of certain thickening agents to the polyurethane formulation is especially desirable in the formation of the bands, particularly when no retaining groove or rib is used. These thickening agents are compatible with other components in the formulation and may be added to the formulation in amounts up to about 1.0% by weight of the total formulation. Examples of suitable thickening agents include fumed silica and certain diamine compounds such as methylene dianiline.

It is desirable to prime the glass bottle with silane before coating. As an example, a mixture of approximately 2% castor oil (Surfactol from the Baker Castor Oil Co.) and up to approximately 2% silane (Dow 6020, 6040 or 6075 from Dow Corning Corp., which are respectively, 3-(2-aminoethylamine) propyltrimethoxysilane, gylcidoxypropyltrimethoxysilane, and vinyltriacetooxysilane) in solvent (70% isopropyl alcohol and 30% acetone) may be used. Other known silane primers may also be used.

Figure 3:
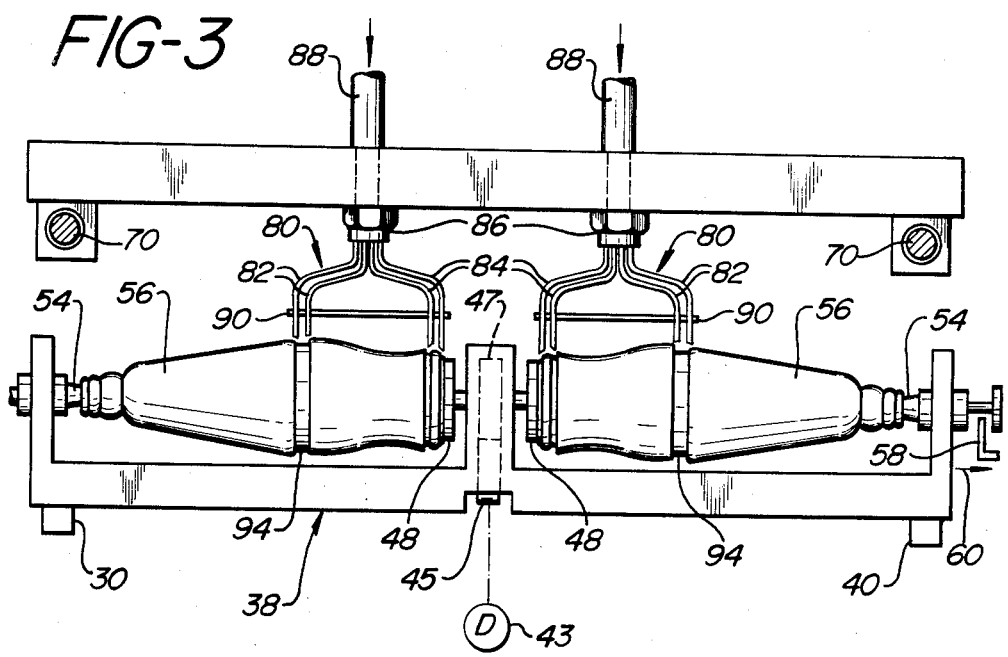
FIG. 3, taken generally along line 3—3 in FIG. 11, depicts a pair of bottles which are supported in bottle chucks and which are about to be coated according to the present invention.

A conveyor mechanism 36 is driven by an appropriate motor and has mounted thereon a plurality of pairs of bottle chucks 38. For the sake of clarity only a few chucks are shown in FIGS. 10 and 11. It should be understood that the chucks are mounted all along the conveyor mechanism 36, however. The conveyor may advantageously include a pair of chains 42 which extend around sprocket wheels 44 and 46. The chains are attached to tabs 40 at opposite ends of the chucks 38 (FIG. 3). A hydraulic motor 43 drives rotation mechanism 45 which may, for example, include a belt extending beneath and in contact with a wheel 47 connected to spindles 48 and rotably mounted on the check 38. The rotation mechanism causes the bottles to be rotated continuously during the flow coating and curing operations, described below.

As shown in FIGS. 10 and 11, the bottles are initially supplied to the conveyor in the loading area 50 by automatic loading devices 52. As shown in FIG. 3, two bottles are positioned in each chuck 38 in contact with the base spindles 48. Spindles 48 are shaped conformed to the bottom contour of the bottles 56. Chuck spindles 54 are then inserted into the mouths of the bottles 56, thereby engaging the bottles securely. Actuator arms 58 on each side of the chuck 38 are moved outward, in the direction of arrow 60, to cause chuck portions 54 to be retracted, thus permitting loading of the bottles 56.

Once loaded, the bottles are transported through a priming station 62 where they are sprayed or otherwise coated with the silane primer described above. The bottles are then transported through a preheating section 64, where a plurality of heat lamps warm the bottles to approximately 180° F. This pre-heating operation increases the fluid flow of the liquid plastic material on the bottle surface during the flow coating operation, thus causing the liquid plastic to be smoothed more rapidly, and also assists in the curing operation. Next, the bottles are carried through the coating station 66. A nozzle carriage 68 is slidably mounted on rods 70 for repeated tracking along with bottles carried by the conveyor 36. The carriage 68 includes a plurality of applicator nozzle means which move along with the bottles on the conveyor and coat them during one rotation of the bottles. The carriage 68 then moves quickly back to its starting point and tracks along with the next group of bottles as they are coated. The bottles are thus coated without requiring that the conveyor stop during the coating operation. Next, the bottles pass beneath a plurality of infrared lamps in a curing section 72. The bottles continue to be rotated during curing to ensure an equal distribution of plastic around the bottles. The bottles are then transported through section 74 where they gradually cool prior to being unloaded at station 76. The coated bottles may then be transported to a bottle filler or to a storage location by means of conveyor 78.

As disclosed more fully in the Waugh '356 patent, a liquid applicator nozzle means 80 (FIG. 3), by which flow coating of plastic liquid onto the surface of each of the bottles 56 is accomplished, includes a plurality of fluid carrying tubes 82 and 84. A fitting 86 connects each of the nozzle means 80 to an associated one of the liquid plastic supply tubes 88, which may preferably include static mixers. The A and B components are pumped from the storage tanks 34 in a precise manner and are mixed together by the static mixers just prior to being applied to the bottles 56. The number and spacing of tubes 82 and 84 will vary in dependence upon the contour of the bottles 56 and the areas on the bottles which are to be protected. A spacer bar 90 holds the tubes 82 and 84 spaced apart and in proper position for coating. The liquid plastic supply system, the hydraulic system, and the electrical control system, the hydraulic system, and the electrical control system of the apparatus of FIGS. 10 and 11 are identical to that disclosed in the above referenced Waugh '356 patent.

According to the present invention, the method of protecting glass bottles from scuffing contemplates protecting a portion or portions of the surface of the glass bottles by means of circumferential bands of plastic material. In the preferred embodiment, the bottle contour is modified in the areas to be protected, such as at 92 and 93, in order to produce precisely defined bands. The contour of the bottles are modified in area 92 by a groove 94 which extends around the bottle 56 in generally the middle portion of the bottle.

The purpose of providing the groove 94 is to contain the plastic material forming the band 98 within a predetermined area and produce a uniform, precise transition line 100 between the plastic 98 and the adjacent glass surface 102 of the bottle 56. If the groove 94 were not provided, it would still be possible to flow coat a band of plastic material around the mid-section of the bottle 56. The band of plastic material, however, would be slightly irregular along the transition lines from plastic surface to glass surface and, additionally, feathering of the plastic along this transition line might occur. When band irregularities and feathering are not objectionable, it is possible to do so; although, it is not preferred. Additionally, if the contour of the bottle were not modified by providing groove 94, coating the bottle would result in a substantial alteration in the bottle contour due to the thickness of the plastic band. This could in some situations, require that the bottle filling equipment and containers be modified to handle the somewhat wider bottles. As may be seen in FIG. 6, and by comparing FIGS. 1 and 2, however, by filling the groove 94 with the liquid plastic material, a protected bottle is produced which has a contour very much like that of the unprotected bottles.

The bottles are rotated about a horizontal axis, as shown in FIG. 3, and uncured plastic liquid is flow coated into the groove 94 from a liquid applicator nozzle means, including a plurality of tubes 82. An amount of plastic liquid is applied to the groove 94 which is sufficient to fill completely the circumferential groove, thereby forming a smooth exterior surface. The groove 94 may be between 0.005 inch and 0.020 inch, and preferably 0.010 inch, in depth. The groove may be between 0.25 inch and 0.75 inch in width. Preferably, the resulting plastic band uses approximately 0.1 gram per lineal inch of plastic material around the bottle. As shown in FIGS. 6 and 8, the circumferential band 98 is thicker along its center line than the depth of the circumferential groove, such that the band is slightly crowned. This is especially desirable where the bottle to be protected has an outer diameter which is substantially constant along a great portion of the bottle. This crowning of the bands 98 assures that contact occurs between protected bottles at the bands, and not elsewhere.

As shown in FIG. 6, the circumferential groove is defined by a generally flat circumferential bottom surface 104 which extends between a pair of side walls 106. The side walls 106 are curved in section, as shown. In a slightly different configuration, shown in FIG. 8, the circumferential groove 94 is defined between a pair of circumferentially extending ribs 108. Each such rib is semi-circular in section.

FIGS. 5, 7, and 9 illustrate a band 110 which extends around the base of bottle 56 and which may take on any one of a number of configurations. The liquid plastic, for example, may be applied in a band around the base of the bottle in a circumferential groove which is semi-circular in section. Alternatively, the liquid plastic may be applied in a band around the base of the bottle in a circumferential groove which is generally rectangular in section. Such bands may be cured to form either a raised bead of plastic material or a band of plastic material closer in diameter to that of the adjacent bottle surface. With such arrangements, the circumferential groove defines very precisely the area to be coated with liquid plastic.

It has been found, however, that it may be desirable to provide a wider band of plastic around the base portion of the bottle. In this regard, it will be appreciated that the lower edge of such a band is very near the base of the bottle and, as a consequence, is not as likely to be noticed as the upper edge of the band. As a consequence, various modifications to the bottle contour may be made along the upper edge of the band, with the lower edge of the band simply being tapered gradually down in thickness to blend in with the contour of the bottle in the area directly adjacent the base of the bottle. Such bottle contour modifications are shown in FIGS. 5, 7, and 9.

In FIG. 5, the upper edge of the band 110 is confined by a circumferential groove 112 which is generally semi-circular in section. As an alternative, FIG. 7 shows the upper edge of the band 110 being confined by a ridge 114 which is generally semi-circular in section. Finally, as a further alternative, FIG. 9 shows an arrangement in which the upper edge of the band 110 is confined by an offset 116 in the contour of the bottle 56. All of these modifications in bottle contour adjacent the base of the bottle result in a band 110 which has a neat, precisely defined upper edge, and which is therefore, aesthetically pleasing.

As illustrated in FIGS. 3, 4 and 5, the applicator means is configured such that several fluid carrying tubes 82 supply a liquid plastic to the circumferential groove 94. While, in some instances, it is possible to use only a single tube 82 to flow coat the circumferential groove, as where a very narrow band of liquid plastic is to be flow coated onto the bottle surface, typically it is preferred to use multiple tubes so as to provide a very smooth, uniform coating of liquid plastic in the groove area. Similarly, tubes 84 are provided to produce a uniform flow coating in the region of the bottle base. Liquid plastic from the tubes merges together so as to form the desired circumferential band prior to curing.

In the arrangement shown in FIGS. 3 and 4, the volume of liquid plastic applied to the groove 94 is approximately the same as the volume of liquid plastic applied to the bottle adjacent the base of the bottle. As a consequence, tubes 82 and 84 are connected through the same fitting 86 to a single supply tube 88. If the contour of a bottle or the thickness or width of the bands indicate that a substantially greater volume of liquid plastic should be coated onto a bottle in one area than in other areas, it may be desirable to provide a separate liquid plastic supply arrangement for each of the areas to be protected. Alternatively, the number and spacing of the tubes may be adjusted to compensate for differences in the volume of liquid plastic required.

It should be appreciated that the protection afforded glass bottles by the above described method of applying a circumferential band of plastic may be modified in some cases. For instance, if desired, glass bottles not having circumferential grooves may be coated with bands of plastic. While increasing the diameter of a bottle, such a band may nevertheless be advantageous where it is impractical or undesirable to provide the bottle with a circumferential groove. Indeed, it may well be that the design of the bottle may take into account the thickness of the plastic bands and that the bottle diameter be increased intentionally by the bands. Polyurethane plastic is transparent and therefore is not readily apparent when applied to a bottle. The polyurethane plastic, when applied over scuff marks, actually tends to make the scuff marks less noticeable.

While the method herein described, constitutes a preferred embodiment of the invention, it is to be understood that the invention is not limited to this precise method, and that changes may be made therein without departing from the scope of the invention, which is defined in the appended claims.

What is claimed is:

1. A method of protecting a portion of the surface of a glass bottle in at least one area from scuffing due to contact with bottle handling and filling equipment, other bottles, and bottle containers, comprising the steps of:

(a) providing a glass bottle defining a circumferential groove in the larger diameter area or areas of said bottle,
(b) rotating the bottle about a horizontal axis,
(c) applying uncured plastic liquid to only the said larger diameter area or areas of said bottle by flow coating said plastic liquid into said circumferential groove from a liquid applicator nozzle means, an amount of plastic liquid being applied which is sufficient to fill completely said circumferential groove, and
(d) curing said plastic liquid to produce a bottle which is protected from scuffing by a circumferential band of plastic material in the area to be protected.

2. The method of claim 1 in which the step of curing said plastic liquid includes the step of rotating said bottle as said plastic liquid cures.

3. The method of claim 1 in which said uncured plastic liquid is a liquid polyurethane having a polyether polyol component, and an aliphatic diisocyanate component, and which cures under infrared irradiation.

4. The method of claim 3 in which said bottle is primed with silane prior to being coated with said polyurethane.

5. The method of claim 1 in which said step of providing a glass bottle includes the step of providing a plurality of circumferential grooves in said bottle surface in the larger diameter areas of said bottle, and in which said step of applying uncured plastic liquid to the bottle surface includes the step of applying uncured plastic liquid simultaneously to said multiple circumferential grooves.

6. The method of claim 1 in which said groove is between 0.005 inch and 0.020 inch in depth.

7. The method of claim 6 in which said groove is approximately 0.010 inch in depth.

8. The method of claim 7 in which said groove is between 0.25 inch and 0.75 inch in width.

9. The method of claim 1 in which the weight of said plastic band is approximately 0.1 gram per lineal inch around said bottle.

10. The method of claim 1 in which said circumferential band is thicker along its center line than the depth of said circumferential groove such that said band is slightly crowned.

11. The method of claim 1 in which said circumferential groove is defined by a generally flat circumferential bottom surface extending between a pair of circumferential side walls, said side walls being curved in section.

12. The method of claim 1 in which said circumferential groove is defined between a pair of circumferentially extending ribs, each such rib being semi-circular in section.

13. The method of claim 1, further comprising the step of applying uncured plastic liquid in a band around the base of said bottle, whereby scuffing of said bottle adjacent said base is substantially reduced.

14. The method of claim 13 in which the upper edge of said band around the base of said bottle is confined by an offset.

15. The method of claim 13 in which the upper edge of said band around the base of said bottle is confined by a ridge which is generally semi-circular in section.

16. The method of claim 13 in which the upper edge of said band around the base of said bottle is confined by a circumferential groove which is generally semi-circular in section.

17. The method of claim 13 in which said uncured plastic is applied in said band around the base of said bottle in a circumferential groove.

18. The method of claim 17 in which said circumferential band around the base of said bottle is a band of plastic material substantially retained within said groove.

19. The method of claim 1 in which said liquid applicator nozzle means comprises a plurality of fluid carrying tubes, and means for supplying plastic liquid to said fluid carrying tubes under pressure, whereby said plastic liquid emerges from said tubes and merges together in said groove to form a continuous band prior to curing.

20. A method of protecting a portion of the surface of a glass bottle in at least one area from scuffing due to contact with bottle handling and filling equipment, other bottles, and bottle containers, comprising the steps of:
(a) providing a glass bottle having a larger diameter area or areas to be protected,
(b) priming said bottle,
(c) preheating the primed bottle,
(d) rotating the bottle about a horizontal axis,
(e) applying uncured, thickened, plastic liquid to only said larger diameter area or areas of said bottle surface by flow coating said plastic liquid from a liquid applicator nozzle means,
(f) rapidly curing said plastic liquid to produce a bottle which is protected from scuffing by a circumferential band of plastic material in the area to be protected.

* * * * *